UNITED STATES PATENT OFFICE.

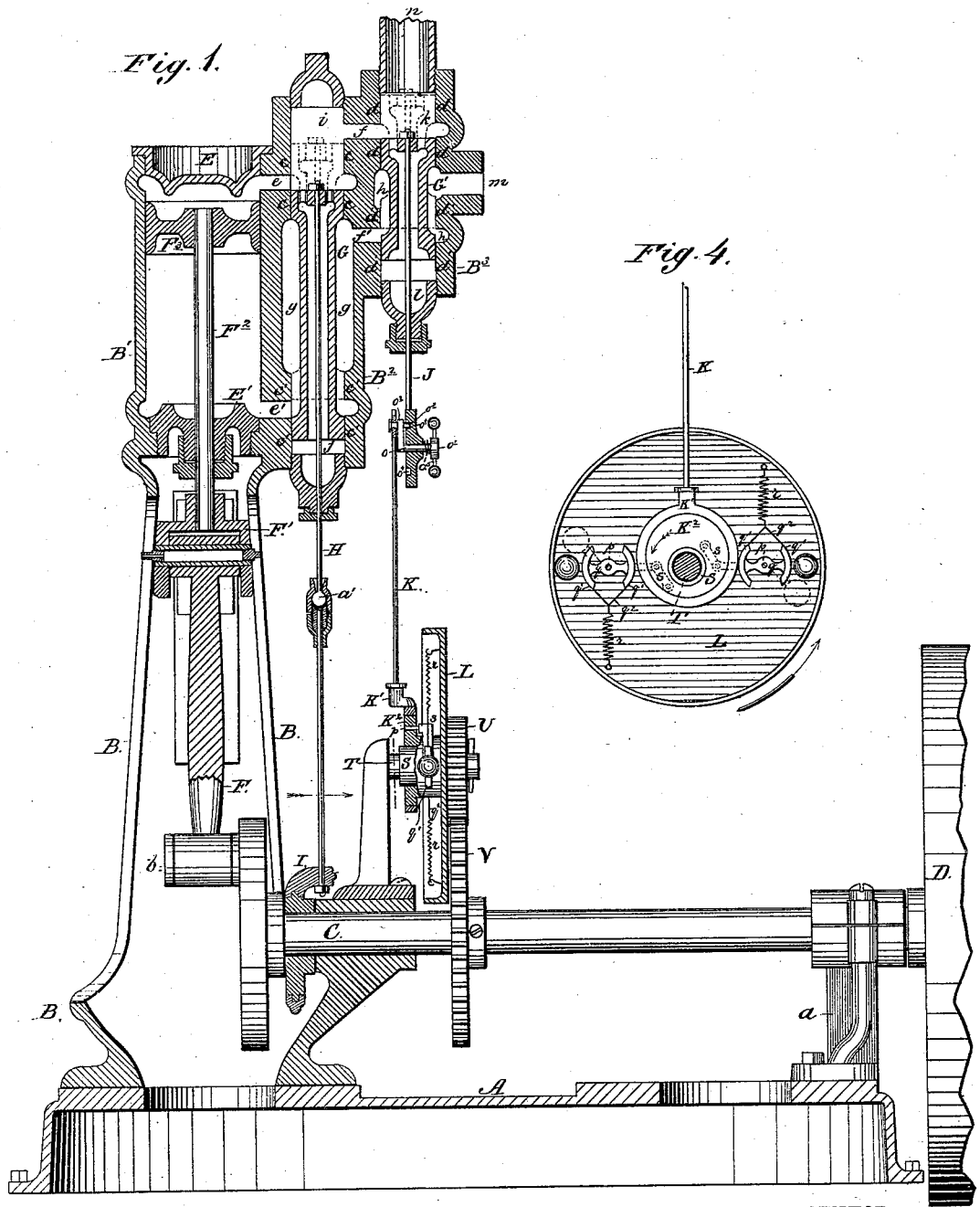

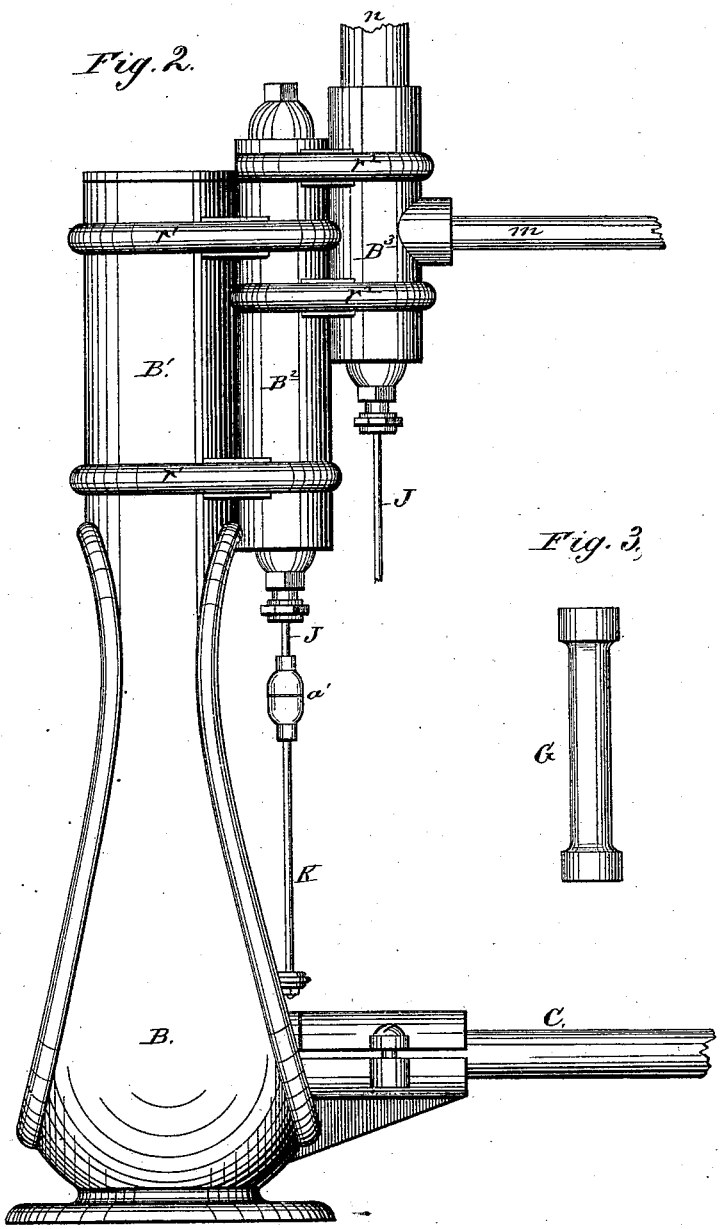

ISAAC H. ALLFREE, OF PITTSBURG, PENNSYLVANIA.

VALVE AND VALVE-GEAR.

SPECIFICATION forming part of Letters Patent No. 247,594, dated September 27, 1881.

Application filed November 23, 1880. (Model.)

*To all whom it may concern:*

Be it known that I, ISAAC H. ALLFREE, of Pittsburg, in the county of Allegheny and State of Pennsylvania, have invented a new and Improved Valve and Valve-Gear for Steam-Engines; and I do hereby declare that the following is a full, clear, and exact description of the same, reference being had to the accompanying drawings, forming part of this specification, in which—

Figure 1 is a vertical section of the whole engine and frame. Fig. 2 is a side elevation of the engine frame and cylinders. Fig. 3 is a detail view of one of the valves. Fig. 4 is a detail face view of the cut-off devices, looking in the direction of the arrow in Fig. 1.

My invention relates to an improvement in valves and valve-gear for steam-engines, designed to secure a balanced action for the valve, a reverse movement for the engine, and an automatic variable cut-off with the greatest economy of material and space, as well as the greatest simplicity of parts.

In the general construction of my devices I adopt the upright form of engine, in which all the reciprocating parts are arranged to move vertically, for the reason, partly, that this secures an economy of space, but more particularly for the reason that the friction is in this position distributed about the periphery of the piston and the vertically-moving valves, and there is no undue friction and wear on one side due to the gravity of the moving parts.

My improvements comprise the following general features: first, the construction of the casing for the valves; secondly, the construction and peculiar arrangement of the valves themselves; thirdly, the peculiar combination of the main working-valve with a reversing-valve; fourthly, in the variable cut-off gear; and, fifthly, in the means for adapting the variable cut-off gear to a coaction with the reversing-valve for cutting off when running in either direction, all as hereinafter more fully described with reference to the drawings.

In the drawings, A represents the bed-plate of the engine, upon which are arranged at opposite ends a bearing, $a$, and the engine-frame B, in which is journaled the horizontal shaft C, constituting the main drive-shaft and carrying the fly-wheel D. The engine-frame is cast in one piece with the cylinder B' and the valve-casings $B^2$ $B^3$, and said frame is made with a wide base bolted down to the bed-plate, and thence rises in the form of two branches, which constitute the guides for the cross-head, until they unite to form the cylinder, which latter is bored out from the top, and has both its upper and lower heads, E E', inserted from the top.

The main shaft C terminates inside the two branches of the engine-frame, and has a disk and wrist-pin, $b$, with which latter there connects a pitman, F, which is attached at its upper end to a cross-head, F', connecting the pitman with the piston-rod $F^2$, carrying piston $F^3$. The construction of this cross-head and its joint with the pitman, and also the construction and arrangement of the cylinder, its heads, and the supporting-frame, I have made the subject-matter of a separate application, and I do not, therefore, claim the same in this case.

In casting the valve-casings and cylinder I make the casing $B^2$, which contains the main working-valve, longer than the cylinder itself, while the casing $B^3$ for the reversing-valve or throttle is made shorter and arranged near the top. Both these casings, as well as the cylinder, are, as before stated, cast in one piece, and they are all arranged in the relation of parallel cylinders, with transverse ribs $r'$ $r^2$ on the outside, which give room for the ports. Within their respective cylinders are arranged the valves—the main working-valve G and the combined throttle and reversing valve G'. Both these valves are made alike, in the form of a tube, preferably of cylindrical cross-section, and open at both ends, the ends of the valves being of sufficient size exteriorly to fit snugly in the seats $c$ $c'$ and $d$ $d'$ of the casing on each side of the ports $e$ $e'$ $f$ $f'$, while the middle portion of the valves are each of less diameter, which reduced diameter, together with the chambered character of the casings, forms an annular steam-space, $g$ and $h$, about the exterior of the valves. At the top and bottom of the main working-valve G the casing is elongated beyond the cylinder to form chambers $i$ and $j$, while corresponding chambers $k$ and $l$ are arranged at the top and bottom of the throttle or reversing valve G'. The inlet for the steam is at $m$, or through the side of the casing of the throttle-valve, and the outlet for the exhaust is at $n$, or at the top of the casing for the throttle-valve and directly communicating with the space $k$.

Now, before describing further the construction of the other parts of my invention, which are necessary to the operation of the foregoing, I will, for the sake of greater clearness, proceed to describe the movements of these valves in the different adjustments of the engine, and then describe the means for effecting these adjustments.

Now, in the normal action of the engine, the valve G moves (see Fig. 1) from the position shown to the position indicated in dotted lines, the movement being effected through the slide-rod H, ball-and-socket joint $a'$, and eccentric I on the main shaft, and when the valve $G'$ is in the position shown the steam flows as follows: Entering at $m$, it passes through chamber $h$, port $f'$, chamber $g$, port $e'$, to the lower side of the piston, raising it and forcing the steam above it out port $e$ to chamber $i$, thence through port $f$ to space $k$, and thence to the outlet $n$. When the position of the valve G is changed by the eccentric, as indicated in dotted lines, the steam flows then from $m$ to $h$, then through $f'$ to $g$, and from $g$ through port $e$ at the top, causing the live steam to force the piston down, and the steam below the piston then passes through $e'$ up through the hollow valve G to the chamber $i$, and thence through $f$ to $k$ and $n$. For both these movements it will be seen that steam is admitted to the valve G through port $f'$, and is exhausted through port $f$.

To reverse the engine the valve $G'$ is thrown up into the position indicated in dotted lines, and $f$ then becomes the entering-port and $f'$ the discharge-port, and the steam flows from $m$ to $h$, through $f$ to $i$, and through $e$ to the top of the piston, forcing it down, while the steam below the piston flows through $e'$ to $g$, thence through $f'$, up the hollow valve $G'$, to $k$ and $n$.

It will be thus seen that for both positions of the main working-valve G the pressure of live steam on the valve is equally exerted on the sides and ends, and perfectly balances the same, and while this result is attained for the valve G the reversing-valve is also balanced by an exactly similar construction and similar principle.

To reverse the engine it will be seen that it is only necessary to give to valve $G'$ a movement from its extreme limit in one direction to its extreme limit in the other direction.

To stop the engine the valve $G'$ must be stopped just half-way, in which position the ends of the valve rest directly over the ports $f$ and $f'$, and shut off the inflow of the steam.

To cut off the steam sooner or later in the stroke of the piston I gear this valve $G'$ with the running parts of the engine, so as to automatically hold the induction-port open a longer or shorter space of time, thus making this valve $G'$ a balance-valve, a throttle-valve, and a reversing-valve and a cut-off valve.

For imparting the necessary adjustments a stem, J, extends from the valve downwardly, and has a horizontal bearing for a short shaft, $o$, which latter has on one end a hand wheel or crank, $o'$, and at the other end a crank, $o^2$, which connects with an eccentric-rod, K. On the crank $o^2$ is a stud, $o^3$, which enters one or the other of two recesses, $o^4$, in the lower end of the stem J, while between the hand-wheel $o'$ and the lower end of stem J is a spiral spring, $o^5$, which serves to hold the stud $o^3$ of crank $o^2$ engaged with one or the other of the recesses $o^4$. Now, as shown, these devices are in the position which holds the valve $G'$ to its lowest adjustment. To reverse the engine the hand-wheel is grasped and forced inwardly against the spiral spring until the stud $o^3$ is out of recess $o^4$, and then the hand-wheel is turned a half-revolution, and the stud $o^3$ again seats itself in the lower recess, $o^4$, and the stem J and eccentric-rod being thus lengthened by the throw of the crank, the valve $G'$ is raised to its highest adjustment, as shown in dotted lines, thus reversing the engine by changing the induction-port into an exhaust-port, and the exhaust-port into an induction-port, the adjustment being preserved against accidental displacement by the interlocking of the stud $o^3$ with the recesses $o^4$.

I will now describe the means for rendering the cut-off valve automatically variable to suit the varying work of the engine.

The eccentric-rod K, at its lower end, is attached rigidly to the yoke $K'$, which encircles and slides loosely over the eccentric cam $K^2$, which is hung upon the sleeve S so as to revolve with it normally, but be capable of an adjustment around said sleeve when necessary.

L is a metal disk rigidly attached to the same sleeve S. Upon the face of this disk is arranged, on each side of the center, a fulcrum-pin, $p$, upon which is mounted a lever, $q$, carrying arched heads $q'$, to which straps or cords $q^2$ are fastened and held under an equal tension by a spiral spring, $r$, attached to the metal disk. Upon the outer ends of each of these levers is fixed a heavy iron ball, while upon the inner ends of said levers links $s$ serve to connect the inner ends of the levers with the eccentric cam $K^2$. Now, supposing the disk to be rotating in the direction of the arrow, Fig. 4, if a speed greater than the normal be suddenly given to the engine by the throwing off of the whole or a part of its work, the increased velocity has a tendency to cause the balls to depart from their position to a position which is a tangent to a circumference described through their fulcrums, as shown in dotted lines, and this motion, through the links $s$, throws the relatively loose eccentric cam $K^2$ in the direction of the arrow into a position where it lifts the eccentric-rod and cut-off valve at an earlier period in relation to the movements of the other parts of the engine, thus cutting off steam shorter and reducing automatically the power of the engine in proportion to the reduction of the work. In arranging these cut-off devices I place them upon a short sleeve, S, hung upon a wrist, T, attached to a bracket mounted on the engine-frame. Now, as the cut-off valve controls the inflow of steam through a single port to both ends of the cylinder, this cut-off valve moves twice to the piston's once—i. e., it must open and close at the end of each stroke of the piston; and for this purpose I arrange a pinion, U, on the sleeve operating the cut-off valve and cause it to mesh with a gear-wheel, V, on the main shaft, which gear-wheel has twice as many teeth as the pinion. By making the cut-off valve so short as not to cover both ports $ff'$, the value of such valve as a reversing-valve is preserved, in connection with its value as a cut-off.

As a modification of this part of my invention, I may dispense with the loose eccentric cam $K^2$ and substitute for it a loose crank having a similar connection with the links $s$. In this modification, however, the sleeve and all of its attachments would have to be turned end for end, so that the pitman and crank could pass the end of the counter-shaft sustaining the sleeve.

Having thus described my invention, what I claim as new is—

1. The steam-cylinder B', main-valve casing B², and reversing-valve casing B³, all cast in one piece in the form of parallel cylinders, and provided with transverse external ribs, $r'$ $r^2$, to form steam-ports, substantially as shown and described.

2. The combination, with the steam-cylinder having ports at its ends, of the main-valve casing B², made longer than the said cylinder, the reversing-valve casing having ports opening into the end and the middle of the casing B², and a pair of valves working substantially as described.

3. The valve-casing B², made longer than the cylinder, and having ports opening into the ends of the cylinder, and ports also opening into the middle and the end of said casing, in combination with a tubular valve open at both ends and working in the said casing, and a second valve and casing for reversing the ports between said second valve and the main valve, substantially as described.

4. The valve-casing B², made longer than the cylinder, and having ports opening into the ends of the cylinder, and ports opening also into the middle and end of said casing, in combination with a tubular valve open at both ends and working in the said casing, and a second valve-casing, B³, and a reversing-valve, made also in the form of a tubular section, open at both ends, substantially as and for the purpose described.

5. A combined reversing and cut-off valve and a variable cut-off gear arranged in line with the valve and connected by reciprocating rods or stems having an adjustable connection between them, as described.

6. The combination, with a reversing and cut-off valve and its stem J and a variable cut-off mechanism and its rod K, of a reversing-connection for the said stem and rod, for definitely increasing or definitely shortening the distance between the valve and its variable cut-off, whereby the valve may be reversed at will and the cut-off gear still be made to co-act with said valve in either of its positions, as described.

7. The combination, with the valve-stem J and the rod K, of a crank connecting these parts, and provided with a hand wheel or lever for adjusting them, substantially as described.

8. The stem J, having a perforated end with recesses $o^4$, the short shaft $o$, having spring $o^5$ and hand-wheel $o'$ at one end, and a crank, $o^2$, with lug $o^3$, at the other, and the rod K, connected with the crank, all combined substantially as shown and described.

9. The combination, with the cut-off valve, the eccentric-rod, and yoke K', of the eccentric cam $K^2$, arranged loosely on the sleeve S, the disk L, arranged rigidly on the said sleeve, and the weighted and spring-held levers $q$, fulcrumed to the disk and connected by the links $s$ with the loose eccentric cam $K^2$, substantially as and for the purpose described.

10. The combination of the main shaft C, having gear-wheel V, the wrist T, sleeve S, bearing rigid disk L and pinion U, the spring-held and weighted lever $q$, the link $s$, the loose eccentric cam $K^2$, and the eccentric-rod, substantially as and for the purpose described.

11. The combination, with an engine and its valve, of a cut-off valve controlling the inflow of steam through a single port, and a mechanism, substantially as described, for imparting two movements to the cut-off valve to one of the piston, substantially as and for the purpose described.

ISAAC H. ALLFREE.

Witnesses:
EDWD. W. BYRN,
CHAS. A. PETTIT.